United States Patent [19]
Kirk et al.

[11] Patent Number: 5,108,292
[45] Date of Patent: Apr. 28, 1992

[54] RELATING TO ORAL SIMULATORS

[75] Inventors: Ewen E. J. Kirk, Dunedin; Tony Pemberton, Wainuiomata, both of New Zealand

[73] Assignees: The University of Otago, Dunedin; Medic Corporation Limited, Lower Hutt, both of New Zealand

[21] Appl. No.: 579,265

[22] Filed: Sep. 5, 1990

Related U.S. Application Data

[63] Continuation of Ser. No. 399,622, Aug. 28, 1989, abandoned.

[30] Foreign Application Priority Data

Aug. 29, 1988 [NZ] New Zealand ............... 225968

[51] Int. Cl.$^5$ ................................. G09B 23/32
[52] U.S. Cl. ........................ 434/263; 434/264
[58] Field of Search ........... 434/263, 267, 262, 264, 434/270; 433/49, 53, 54

[56] References Cited

U.S. PATENT DOCUMENTS

| | | | |
|---|---|---|---|
| 3,877,156 | 4/1975 | Itoh | 434/267 |
| 3,931,679 | 1/1976 | Carter | 434/264 |
| 4,035,920 | 7/1977 | Saupe | 434/263 |
| 4,067,109 | 1/1978 | Engeser | 434/264 |
| 4,096,645 | 6/1978 | Mandl | 434/264 X |
| 4,231,181 | 11/1980 | Fabricant | 434/264 X |
| 4,395,235 | 7/1983 | Becker | 434/270 |

FOREIGN PATENT DOCUMENTS 2053255 6/1979 Fed. Rep. of Germany ...... 434/263

*Primary Examiner*—Richard J. Apley
*Assistant Examiner*—Karen Richard
*Attorney, Agent, or Firm*—Ladas & Parry

[57] ABSTRACT

The present invention is a dental oral simulator designed to teach the skills an operator will require in practice when dealing with a supine patient in the ergonomically preferred work zone in the midsagittal plane at heart level and in myocentric relationship.

Training jaws of the dental simulator are supported to simulate the movement of the jaws in a skull about the occipito-atlantal joint. A concave dish supported on the end or a mounting arm provides bearing support for a semi spherical bowl with the attachment between the bowl and the concave dish operating to allow controlled movement of the bowl through the range of useful dental treatment anatomical movements by a human skull about its occipito-atlantal joint with the mounting for the training jaws located on the mandible plane.

4 Claims, 5 Drawing Sheets

RELATING TO ORAL SIMULATORS

This is a continuation of copending application Ser. No. 399,622, filed on Aug. 28, 1989, now abandoned.

This invention relates to dental oral simulators.

BACKGROUND

Ergonomic dental work stations have remained substantially the same for many years. Manufacturers have improved other equipment and training institutions have taught students how this equipment can best be used. Nevertheless, the principal ergonomic and dental operator performance requirements relating to oral care remain in need of careful review. We believe the optimum control for the fine manipulative task undertaken in dental care requires a seated operator working to a mid-line preferred position which will often be at heart height.

Anthropometrically, the body sets itself to perform fine manipulative skills by adopting an optimum position for control. In dental work, the mouth of the patient needs to be brought to that optimum position while preserving the patient's safety and comfort and giving the operator maximum visibility of the work area. The most effective and practical way to meet this requirement during oral care procedures is to have the patient in a supine position.

A specific treatment station or zone requires the patient to be reclined on his back, with the patient's head supported so that the patient's mouth is correctly located relative to the work zone and the operator. The operator will be seated behind the patient's head at a preferred height and with unimpeded access to the patient's mouth. An assistant will be seated to one side of the patient with the principle task of supporting the operator and caring for the patient's safety during treatment.

As has been recognised for many years, it is necessary to teach a dental operator the skills he will subsequently use in practice, and it is preferable for the training to be undertaken reproducing, as closely as possible, the conditions which will be experienced in treating a patient, so that the learned skills will not need to be transmuted to be applied.

Simulators are commonly used in dental training and these have ranged from simple training teeth and jaws to very complex and realistic models, i.e. human dental mannequins. The mannequins have been directed to training operators for more traditional dental treatment stations. The mannequins also have not focused upon the natural skull movement about the occipito-atlantal joint, and therefore have not been realistic of the movements which will be experienced when treating a patient, particularly in a supine position.

THE PRESENT INVENTION

The present invention is a dental oral simulator designed to teach the skills which an operator will require in practice when dealing with a supine patient in the ergonomically optimised work zone as discussed above.

The dental oral simulator has a support (e.g. dish) at an ergonomically acceptable position for dental manipulation. An occipital simulator is supported in said support so as to allow controlled relative movement between the support and the occipital simulator similar to a range of anatomical movements useful in dental treatment by a human skull about its occipito-atlantal joint. A jaw support is in the occipital simulator. Training jaws are supported on said jaw support so that movements of the occipital simulator in said support causes the jaws to move to simulate the movement of the jaw in a skull about the occipito-atlantal joint.

The support preferably is a concave dish fixed to the end of an arm attached to a support surface with a position control to allow a selected range of positions to be adopted between the occipital simulator and the concave dish.

The positions are selected and related to training procedures so that an operator can be taught skills with precision by organising the work base (jaws) into a limited number of positions, allowing for the head movements of the patient but with stable end positions.

The simulator according to the present invention provides students with a deliberate, precise and accountable strategy for achieving desired results. Optimum control of posture position and movement, assurance of sustained quality and preparation for patient care with a minimum of stress and fatigue.

The simulator has been designed having regard to perceive performance logic based on the analysis of a dental trainee's fundamental relationship to gravity and the trainee's proproceptive senses and has natural inclination to perform finite procedures in the midsagittal plane at heart level and in myocentric relationship. A balance reference posture is established for the seated trainee, a horizontal support presents the same configuration as a supine patient and the trainees reference posture is maintained throughout a range of clinical procedures that can be instructed with reference to the determined positions of the occipital simulator and the opening configuration of the training jaws supported thereby.

DRAWING DESCRIPTION

PREFERRED EMBODIMENT OF THE INVENTION

Figure 1:
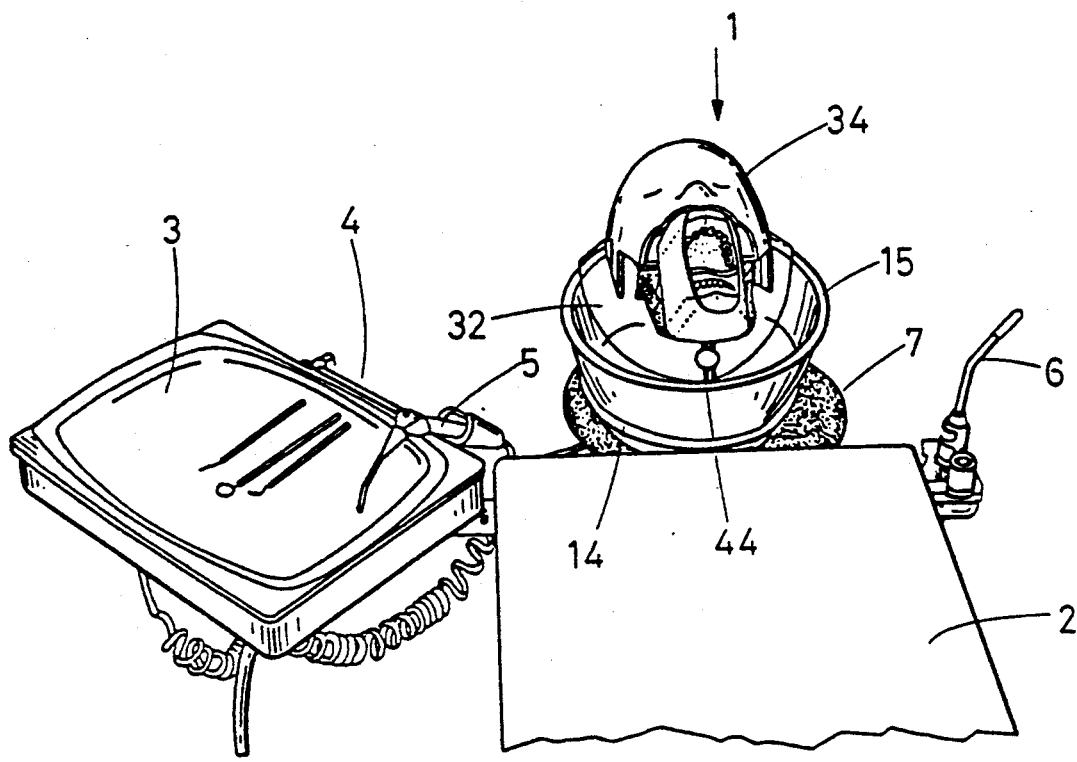
FIG. 1 is a pictorial view of the training simulator according to the present invention at a training station.

A dental training simulator 1, representing a "patient's" head, is supported in a work zone at the end of the bench top or table 2 which simulates the area that would support the "patient" in a supine position with the trainee operator working behind the head of the "patient". The table 2 also enables the dental equipment to be located relative to the work zone with an equipment tray 3, a hand piece 4 for a drill, and an operator syringe 5 on one side and an evacuating located nozzle 6 located on the opposite side of the table 2. An adjustable height stool 7 behind the simulator 1 and at the end of the work zone allows a trainee operator to be seated at the most convenient height for the trainee to assume the optimum work position to perform the manipulative skills required in dental training.

Figure 2:
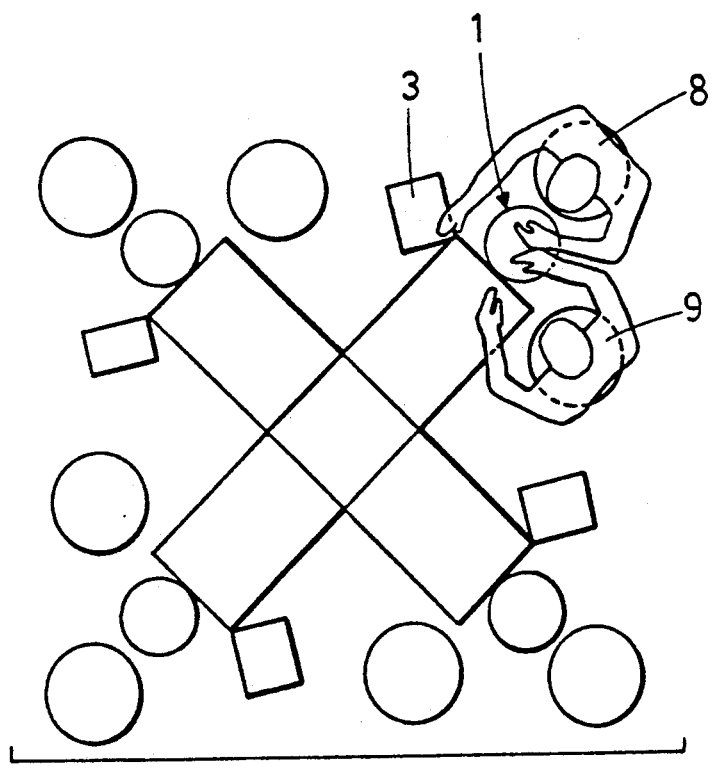
FIG. 2 is a plan view of a training unit combining a plurality of training stations.

In FIG. 2 the position of the operator 8 and assistant 9 is diagrammatically represented and replicated in a training unit where four training zones are combined in a single unit. The construction and configuration of such a training unit is described and claimed in New Zealand Patent Specification No. 229979.

The dental simulator according to the present invention is illustrated in more detail in FIGS. 3 to 6 of the drawings. The simulator has an arm 10 designed to be attached to the support table 2, for example using a simple clamping mechanism so that the arm may be adjustably held relative to the support top 2. The arm, preferably metal and corrosion resistant has a stem 11, an offset section 12 and a bifurcated head 13 to which is attached a lower, outside portion of a mounting dish 14 with an inside surface that is concave downwardly toward the arm. The mounting dish is preferably formed from a high impact plastics material such as a polycarbonate and is generally saucer shaped with the concave depression arranged to provide a bearing surface which is complimentary to a semi-sypherical lower outside of an occipital simulator 15 mounted therein. The dish member 14 is attached to the bifurcated head 13 of the arm 10 by three mounting studs 16. A plurality of nylon buttons or stud heads 17 project from the inner surface of the member 14 to facilitate the bearing surface between the occipital simulator and the dish 14 and a plurality of rubber spacers 18 assist in maintaining the relative positions between the occipital simulator and the dish when the desired position has been set.

A gate is provided in the dish 14 by three parallel slots 20, 21, 22 with the central slot 20 located on the central line of the dish and the slots 21 and 22 symmetrically arranged on each side of the slot 20. A transverse slot 23 connects the three slots together. The gate is designed to allow the relative movement between the dish and the occipital simulator to be such that a range of movements may be accommodated acceptable for dental training purposes. It would be appreciated that while the gate is shown as a series of slots it would be possible for the gate merely to be an opening of appropriate dimensions.

The slots allow an operator to select more positively positions with the extremities of each slot providing six finite positions and with any intermediate positions being along the length of the slots selected by reference to markings on the occipital simulator.

The length of the slots is designed to allow movement of approximately 37 degrees with 25 degrees forward and 12 degrees rearward movement of the occipital simulator from vertical or the upright position (downs occu vertical) with the transverse slot located at about 8 degrees from the end of the slot generating rearward movement of the occipital simulator (i.e. on the Frankfurt vertical). The side slots permit between 15 and 20 degrees of movement on either side of the central position. It would be appreciated that the dimensions as supplied are by way of example and any range of movement acceptable for dental training purposes could be adopted.

To allow for more extreme sideways movement, apertures 24 and 25 are provided through the member 14 and the occipital simulator can be mounted in these apertures where the more extreme sideways positioning is necessary. The support dish may be strengthened by having grooves or ribs moulded therein in a manner which will not interfere with the relative movement between the occipital simulator 15 and the dish 14.

The occipital simulator 15 is a semi-spherical bowl with the outside surface complimentary to the surface of the dish 14 to provide the bearing engagement as above described. The bowl is preferably formed from a high impact plastics material such as clear polycarbonate. A position control member 26 having a square section one end at the outside surface of the bowl that is designed to fit neatly within the grooves 20 to 23 and the apertures 24 and 25 extends from a lower portion of the outside surface of the bowl. At the opposite end of the member 26 is a stud 27 which is engaged by a clamping nut 28 for pressing a clamping sleeve 29 that is about the stud against the under surface of the member 14, thereby holding the bowl 15 and the dish 14 together in a selected position. A lock nut 30 is also provided on the stud against the clamping nut and must be removed for the position control means to be disengaged so that the bowl 15 can be removed for cleaning or for positioning in the apertures 24 and 25.

It will therefore be seen that by use of the positioning control means the relative position between the support dish 14 and the occipital simulator 15 can be controlled.

The occipital simulator 15 has an internal radial wall 31 fixed to project inwardly from the inside wall of the bowl with an inner edge providing support and locating means for a jaw mounting member 32.

The jaw mounting member 32 is essentially arranged on the mandible plane and is a removable member with guides (studs) arranged to engage on either side of the inner end of the brace wall 31. The lower end of the jaw mounting member 32 is positioned between two studs 33 projecting up from the inner surface of the bowl 15. The inner surface of the also similar bowl has side studs 33a so that once the member 32 is slid into position, it is firmly supported within the bowl without the need of any separate attachment means. It should be appreciated, however, that this is intended to be illustrative only of a means whereby a jaw support plane can be provided and, for this, the jaw mounting member may be supported in any convenient manner. The important thing is that the member 32 is essentially on the mandible plane, is braced so that it will withstand the forces that are generated during dental training and can be easily removed. The wall 31 and the member 32 are also preferably formed from a high impact plastics material and the top of the member 32 is designed to support a face mask 34 which is formed from the same plastics material, preferably clear polycarbonate.

Training jaws 35 are mounted on the member 32 with the relative positions between the training jaws 35, the mounting member 32, the occipital simulator 15 and the support member 14 being such that the training jaws are presented at a position which will simulate the movement of the skull about the occipito-atlantal joint.

The training jaws need to be mounted in a manner which will allow the opening of the jaws to be adjustable and for the jaws to be firmly in position to withstand the forces which will be generated during dental training.

Figure 7:
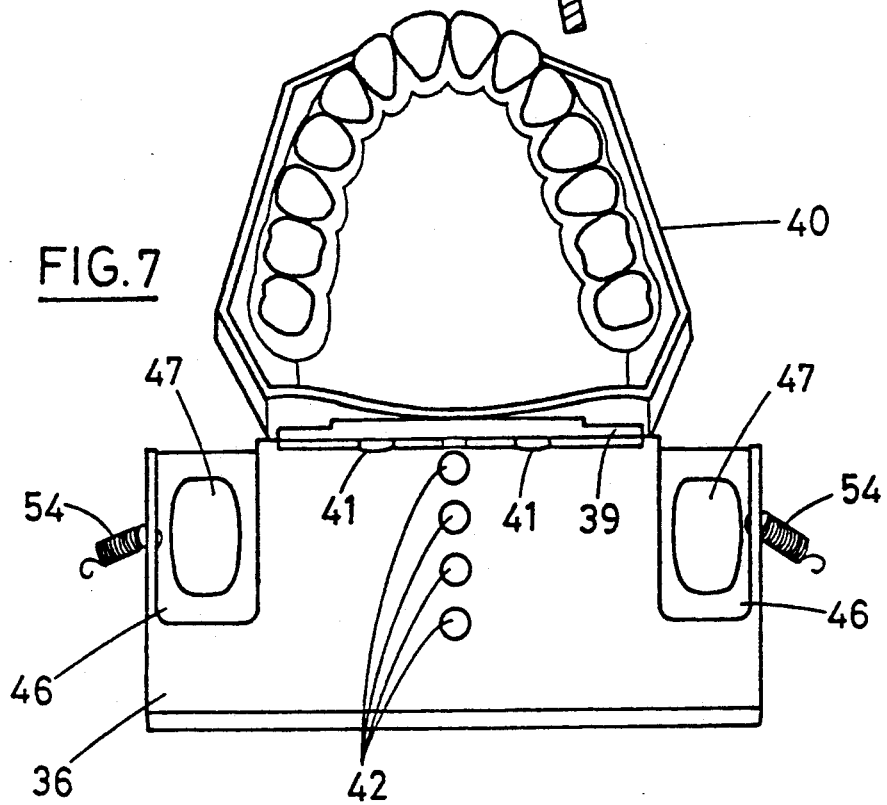
FIG. 7 is a detailed view of the top set of training jaws and mounting means.
Figure 6:
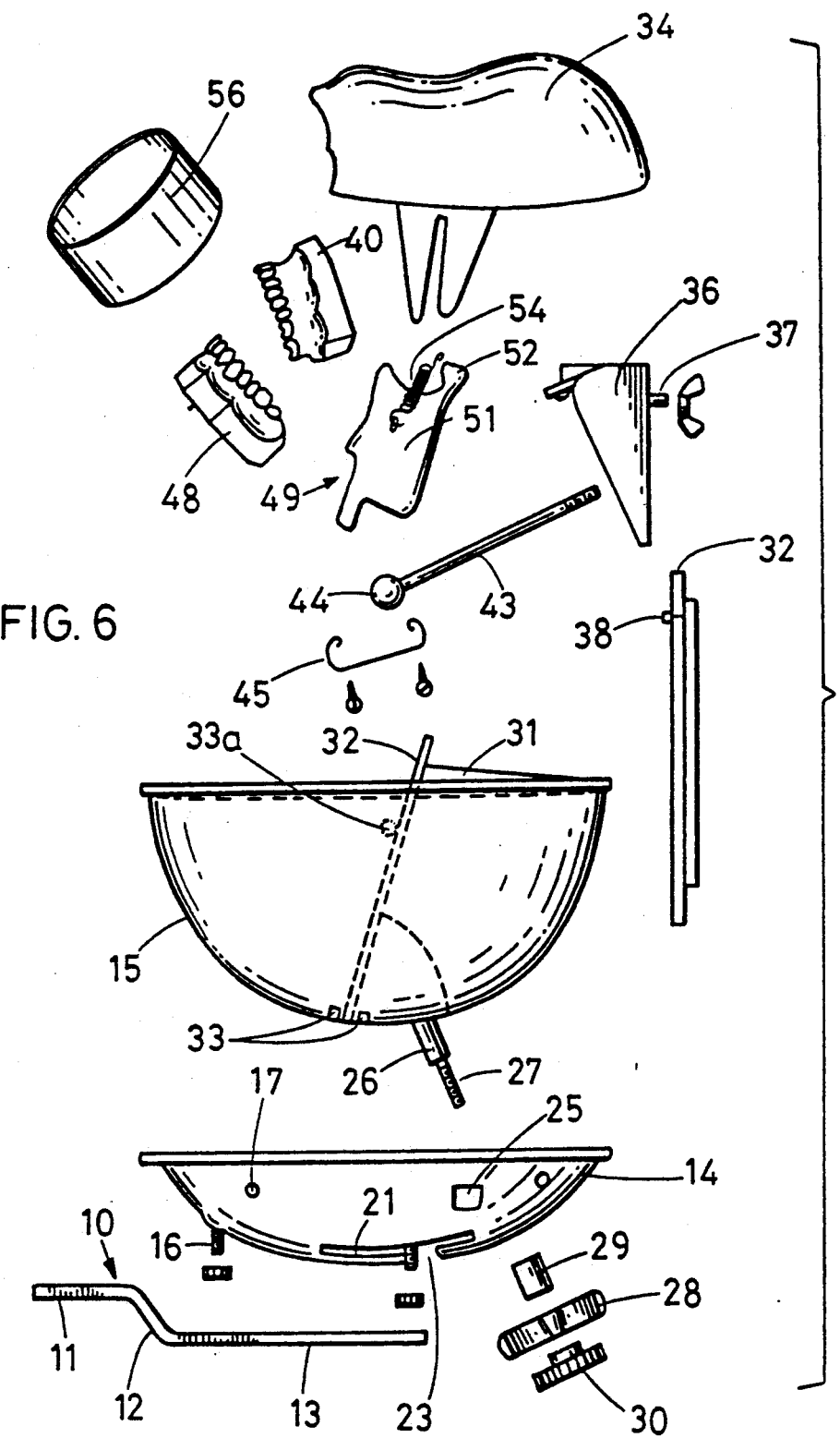
FIG. 6 is an exploded view of the components in the dental simulator.
Figure 8:
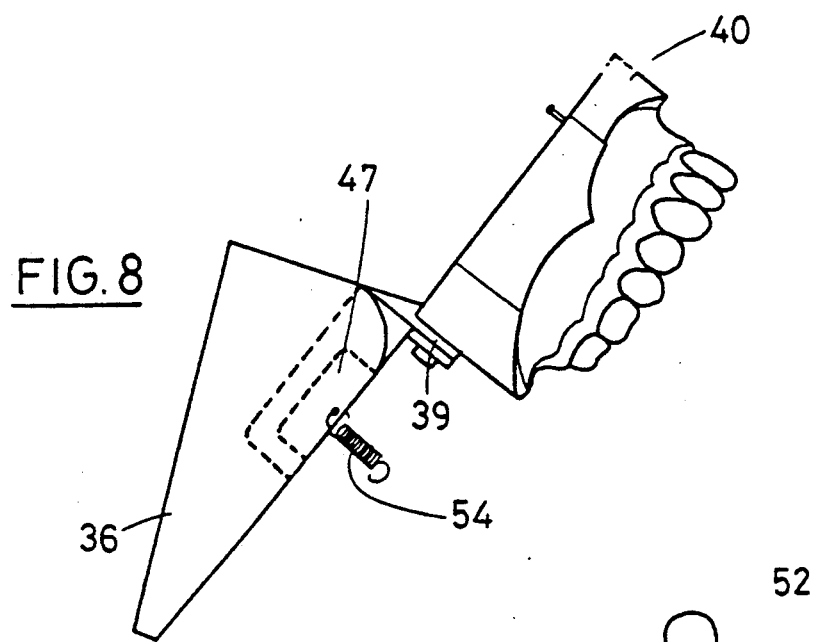
FIG. 8 is a side view of FIG. 7.
Figure 9:
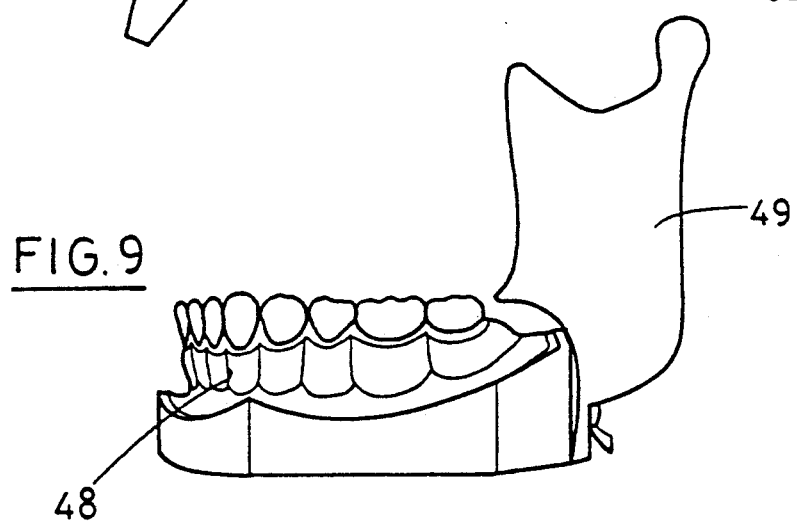
FIG. 9 is a side view of the bottom set of training jaws and mounting member.
Figure 10:
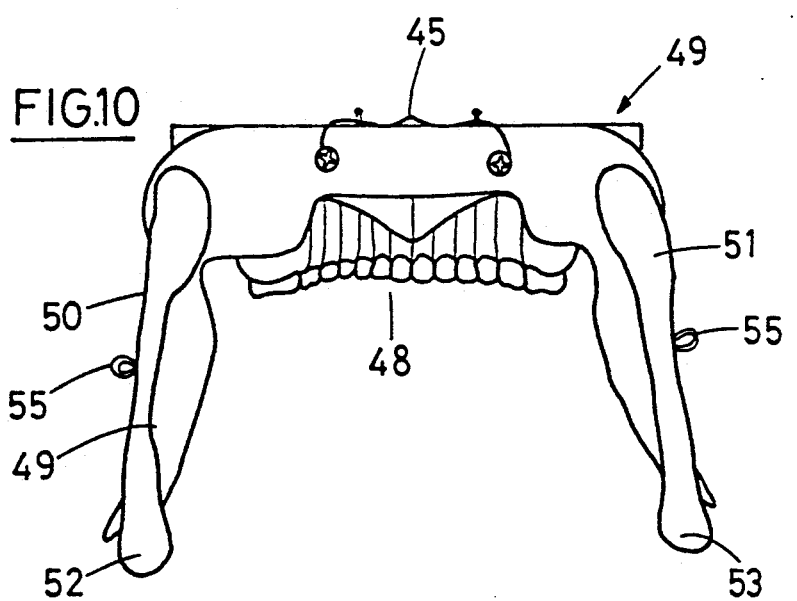
FIG. 10 is a rear elevation of FIG. 9.

A mounting needs to be incorporated or attached to the member 32 at or towards the upper end thereof and in the preferred example a mounting block 36 is attached to the member 32 by a stud 37 and two projections 38 from the member 32 engaging with apertures in the block 36. The block 36 is shown in more detail in FIG. 7 and is preferably a metal block having a top lip 39 to which the top denture 40 of the training jaws 35 can be fixed by screws 41. A plurality of four apertures 42 having threaded sockets contained therein are provided in use to be engaged by a rod 43 having a nob 44 at the end thereof for ease operated control. The rod 43 passes through a metal loop 45 which when in use is attached to the frame carrying the bottom dentures so that adjusting the position of the rod 43 in the apertures 42 the degree of opening of the jaws can be controlled.

The metal block 36 has at either side and towards the top a recess in which is located a moulded plastics insert 46, a plastics insert has formed therein an aperture or recess 47. The lower jaw 48 of the training jaws 35 is attached to a carrier 49 which has two arms 50 and 51 with protruberances 52 and 53 designed in use to engage within the recesses 47 in the metal inserts on the plate 36. This construction replicates as nearly as possible the natural movement of the jaws. Two biasing springs 54 are attached to extend from the side of the metal block 36 to eyes 55 on the member 50 supporting the bottom jaw 48. A rubber skirt 56 is able to be stretched over the training jaws to simulate the cheek flesh of the patient.

Figure 3:
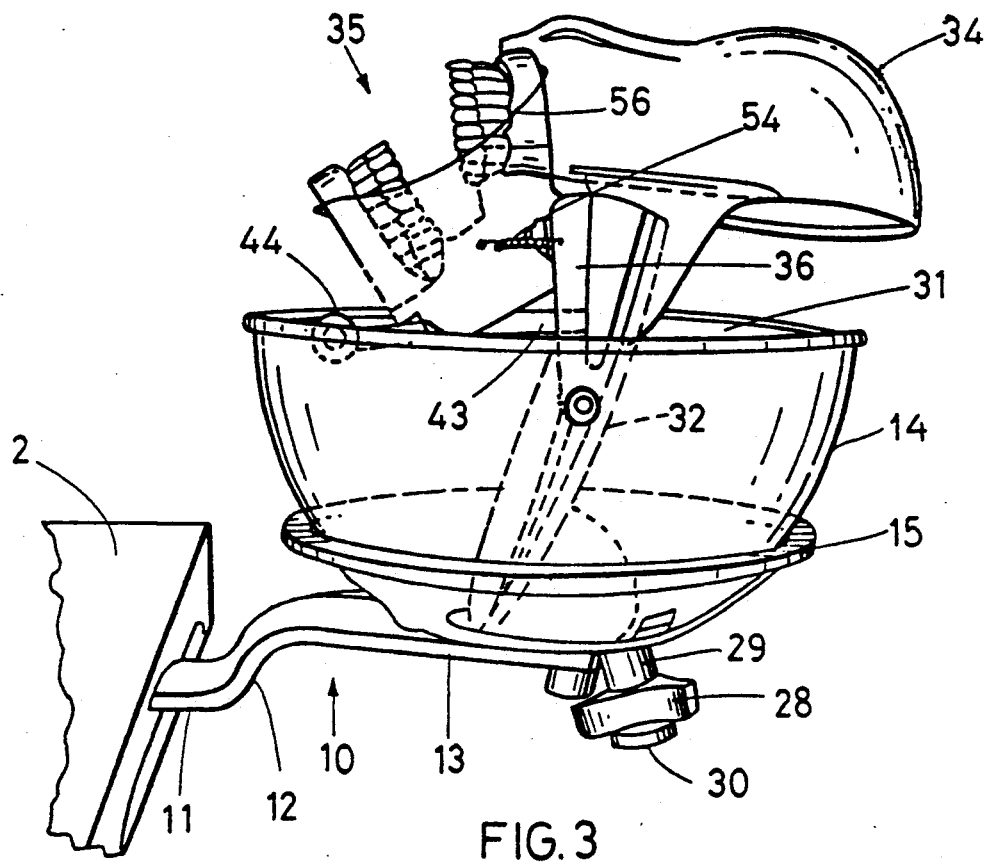
FIG. 3 is a side pictorial view of the dental training simulator according to the present invention.
Figure 4:
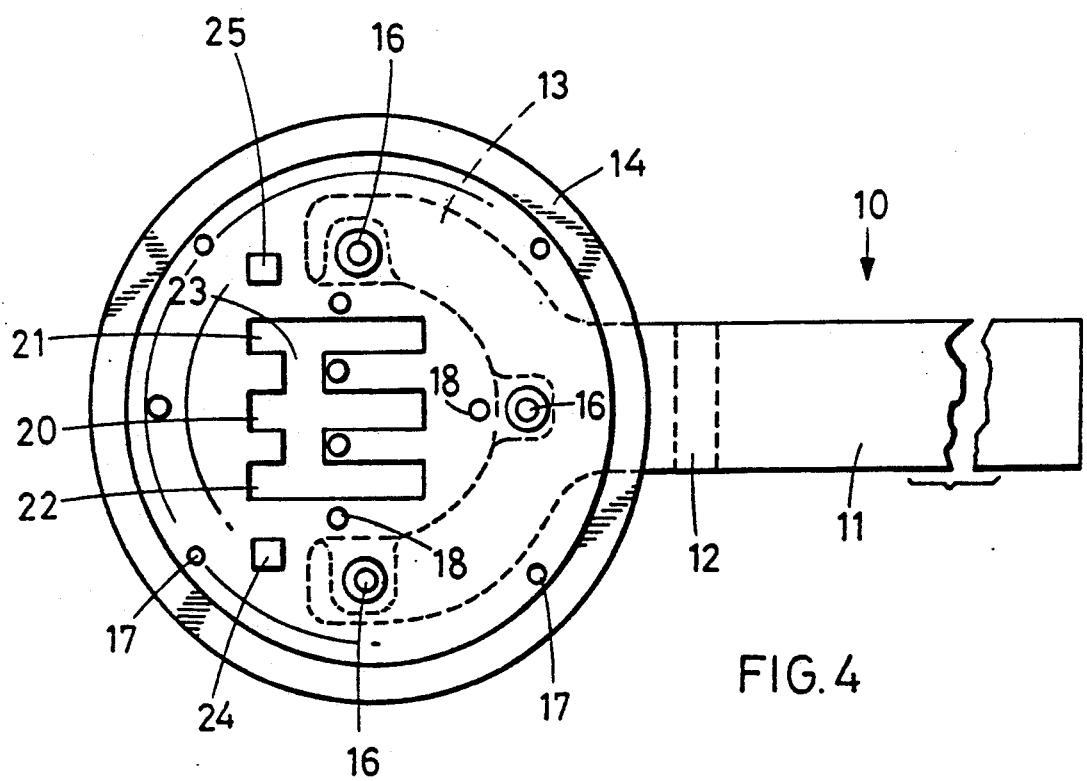
FIG. 4 is a plan view of the mounting arm and support dish.
Figure 5:
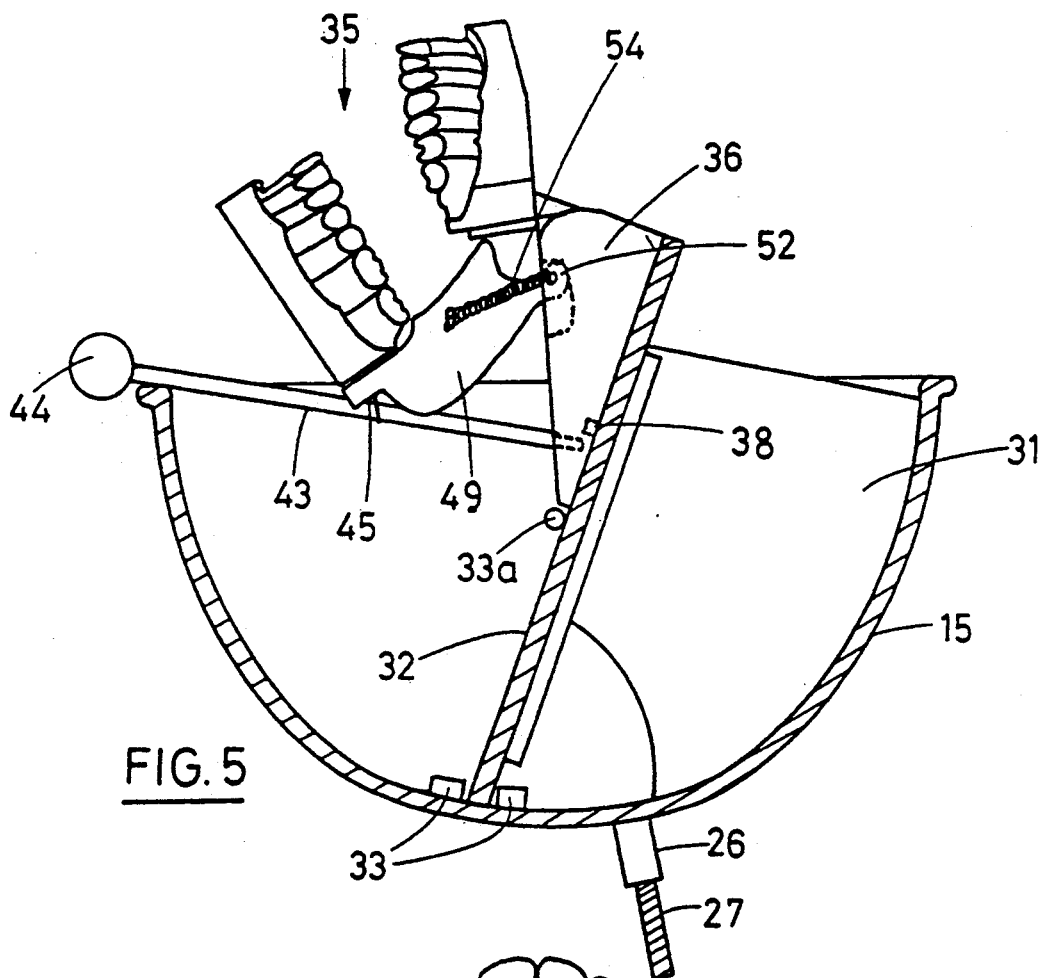
FIG. 5 is a partial sectional elevation through the occipital simulator with the training jaws attached.

The simulator according to the present invention is shown in the assembled position in FIG. 3 and in the training position relative to the training station in FIG. 1.

The simulator is designed as closely as possible relying upon anthroprometic averages from a statistically credible number of patients to replicate the movement of the training jaws supported in the occipital simulator in the same manner as the jaws would be moved in the skull of the patient about the occipito-atlantal joint.

The mounting and movement of the training jaws allows the jaws to be set at a range of openings and the movement between the occipital simulator 15 in a mounting dish 14 by using the gate and position control means allows predetermined positions to be readily selected by a trainee who can then be instructed in dental manipulation with a training reference which relates directly to the position of a patient when the training technique is to be applied in practice.

It would be appreciated from the foregoing description that the manner of manufacture of the dental simulator uses the bowl to accumulate any water or other waste generating during the training procedures and the construction enables the components in the simulator to be readily dismantled for emptying and cleaning. Also the use of the clear plastics material enables the attention of the operator to be focused upon the training jaws without distraction. The simulator according to the present invention is thus designed to organize the work place (i.e. the training jaws) into a limited number of positions allowing for simulated head movements of a patient but with stable end positions suitable for training. The dental trainee is trained in a work zone where he is able to maintain control of the tasks which must be performed from an ergonomic position most suitable for performing of those difficult manipulative tasks. The operators have a specific view line, a specific instrument position and a specific position for the ancillary equipment and for the assistant. All of these positions and conditions will be the same as experienced in the practical treatment of a patient.

What is claimed is:

1. A dental oral stimulator comprising a mounting means with a concave depression to provide a bearing surface, said mounting means being supportable at an ergonomically appropriate position for dental manipulation, an occipital simulator in the form of a hollow open topped semispherical bowl having an outer surface of the bowl generated about a simulated occipito-atlantal joint, said bowl being supported in said mounting means with the bearing surface of the mounting means complementary to the outer surface of said bowl, position control means to allow controlled relative movement between the bearing surface of said mounting means and said bowl to simulate a range of anatomical movements useful in dental treatment by a human skull about its occipito-atlantal joint, a transverse jaw support plate removably mounted within said bowl, said plate passing through the axis of the simulated occipito-atlantal joint, training jaws removably supported on said jaw support plate with said plate and jaws being located so that movement of said bowl in said bearing surface of the mounting means controlled by said position control means causes said training jaws to move to simulate movement of jaws in a skull about the occipito-atlantal joint.

2. A dental oral simulator comprising a support arm attachable to a support member, a concave dish fixed to the end of said arm with a concave depression of said concave dish providing a bearing surface, said support arm and concave dish being supportable at an ergonomically appropriate position for dental manipulation, gate means in the concave dish provided by a pattern of interconnected slots to accommodate movement of substantially 37° and 25° forward and 12° back and 15° to 20° on either side, a complementary occipital simulator provided as a hollow open topped semispherical bowl having an outer surface of the bowl generated about a simulated occipito-atlantal joint when said outer surface of said bowl is supported in said concave dish with a position control member to protrude through said gate means to allow controlled relative movement to simulate movement in the sagittal plane between the concave dish and said bowl similar to a range of anatomical movements useful in dental treatment by a human skull about its occipito-atlantal joint, holding means operable to allow the bowl to be held in any one of a number of positions for dental training predetermined by the location of the position control member in the gate means to retain said bowl in a selected position, a jaw support plate removably mounted within the bowl, said plate passing through the axis of the simulated occipito-atlantal joint, training jaws removably supported on said jaw support plate with said plate and jaws being located so that movement of said bowl in the bearing surfaces of the concave dish controlled by the gate means, position control member and position holding means causes the training jaws to move to simulate movement of the jaws in a skull about the occipito-atlantal joint.

3. A dental oral simulator as claimed in claim 2 wherein the gate means has three parallel grooves with the central groove on the central axis of the dish and the other grooves symmetrically positioned about the central groove and with a transverse groove connecting the three parallel grooves.

4. A dental oral simulator as claimed in claim 3 wherein the transverse movement through said gate means is provided at approximately 8 degrees from the rearward position end of the groove.

* * * * *